United States Patent
Jones et al.

(10) Patent No.: US 7,761,224 B2
(45) Date of Patent: Jul. 20, 2010

(54) DRIVE TRAIN

(75) Inventors: Stephen John Jones, Karlsruhe (DE); Bertrand Pennec, Strassbourg (FR); Andreas Walter, Karlsruhe (DE); Thomas Winkler, Offenburg (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/496,814

(22) Filed: Jul. 2, 2009

(65) Prior Publication Data
US 2009/0271099 A1 Oct. 29, 2009

Related U.S. Application Data

(63) Continuation of application No. PCT/DE2007/002220, filed on Dec. 10, 2007.

(30) Foreign Application Priority Data

Jan. 5, 2007 (DE) .................. 10 2007 001 172

(51) Int. Cl. *G06F 19/00* (2006.01)
(52) U.S. Cl. ..................... 701/115; 701/102
(58) Field of Classification Search ............ 123/406.24, 123/406.26, 406.27; 701/101–103, 111, 701/114, 115; 73/114.02–114.12
See application file for complete search history.

(56) References Cited

U.S. PATENT DOCUMENTS

| 5,278,760 | A | | 1/1994 | Ribbens et al. |
| 5,307,670 | A | * | 5/1994 | Imai et al. ................. 73/114.04 |
| 5,426,587 | A | * | 6/1995 | Imai et al. .................... 701/111 |
| 5,951,618 | A | * | 9/1999 | Fukuchi et al. ............. 701/110 |
| 6,474,145 | B1 | * | 11/2002 | Fukuchi et al. ........... 73/114.07 |
| 6,530,360 | B1 | * | 3/2003 | Kondo ................... 123/406.27 |
| 6,968,268 | B2 | * | 11/2005 | Yamada et al. .............. 701/111 |
| 6,978,666 | B1 | * | 12/2005 | Wu et al. .................. 73/114.04 |
| 2005/0090968 | A1 | | 4/2005 | Sato |

FOREIGN PATENT DOCUMENTS

| DE | 100 63 457 | | 6/2002 | |
| EP | 0 637 738 A | | 2/1995 | |
| JP | 2001041097 A | * | 2/2001 | ............ 73/114.04 |
| JP | 2004218605 A | * | 8/2004 | ............ 73/114.04 |

* cited by examiner

*Primary Examiner*—Willis R Wolfe, Jr.
(74) *Attorney, Agent, or Firm*—Lucas & Mercanti, LLP

(57) ABSTRACT

A drive train, for a motor vehicle that has a drive unit controlled by a control device, a driveshaft and an element, which is operatively connected to the drive shaft and is driven by the same. At least one state value of the driven element is read into the control device, and a balancing of the cylinder of the drive unit is carried out utilizing the at least one state value.

16 Claims, 2 Drawing Sheets

DRIVE TRAIN

Figure 1:
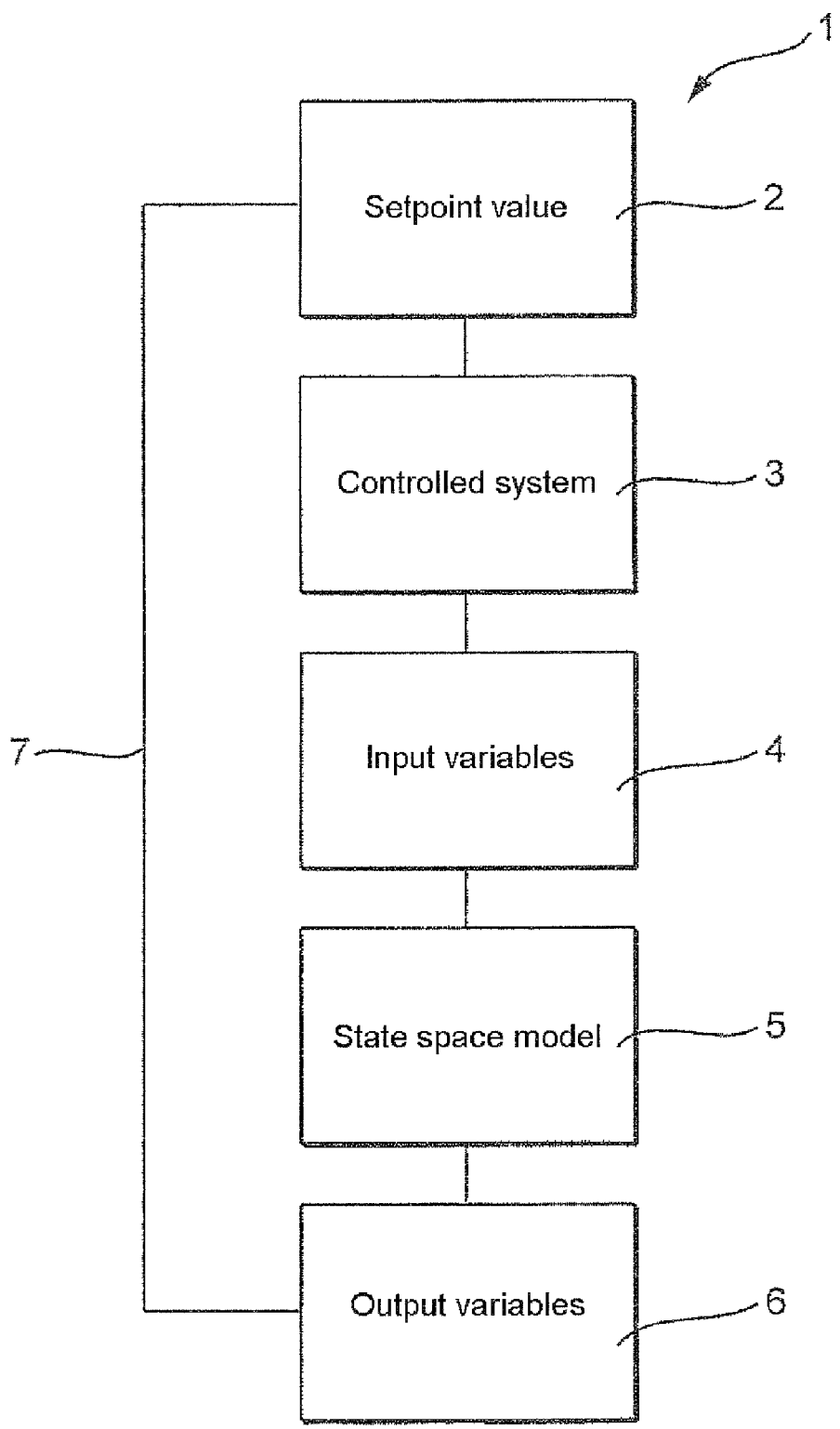

This application is a continuation of PCT/DE2007/002220 filed Dec. 10, 2007, which in turn claims the priority of DE 10 2007 001 172.7 filed Jan. 5, 2007 the priority of both applications is hereby claimed and both applications are incorporated by reference herein.

The invention relates to a drive train and a method for operating same, in particular for a motor vehicle having a drive unit which is controlled by means of a control unit having a drive shaft and an element which is operatively connected thereto and is driven thereby.

Arrangements in a drive train, in which an internal combustion engine is controlled by means of an engine management system, are known. In arrangements of this type, what are referred to as combustion misfires cannot be ruled out. A combustion misfire is an event during which the combustion of the fuel/air mixture in a cylinder of the internal combustion engine fails to occur entirely or occurs partially. If no combustion occurs or only partial combustion occurs, the cylinder does not perform any combustion work, or performs less combustion work, and no combustion torque, or less combustion torque, is built up.

There may be various reasons for the occurrence of combustion misfires. In the case of spark-ignition engines, it is possible, for example, for a faulty ignition system or worn sparkplugs to cause combustion misfires to occur. In this case, the ignition energy is no longer completely sufficient to ignite the mixture. A further cause of combustion misfires is, for example, an excessively lean air/fuel mixture. The quantity of fuel which is supplied here is too low in order to be ignited. An unfavorably distributed mixture can also lead to combustion misfires occurring. Combustion misfires frequently occur in diesel engines, particularly at low temperatures in the warming up phase.

A combustion misfire causes the engine rotational speed to appreciably dip in parts, which has an adverse effect on the smooth running of the engine. The unburnt mixture finally passes into the exhaust train via the outlet valves. This leads to post-combustion of the mixture in the hot catalytic converter and as a result to an additional severe rise in the temperature. As a result of the high temperatures, the catalytic converter ages significantly more quickly and can even be destroyed. Combustion misfires additionally have an adverse effect on the exhaust gas behavior. When the ignition behavior is faulty, unburnt hydrocarbons are released. However, the emission of hydrocarbons (HC) and carbon monoxide (CO) increases also during malfunction of the fuel injection, since the temperature of the combustion chamber walls and of the exhaust gas drops. Since the oxygen has not completely reacted when there is a combustion misfire, the lambda gas probe supplies a "fault" signal. This results in the lambda controller of the engine calculating an incorrect fuel/air mixture and as a result subsequently injecting an excessively rich fuel/air mixture into the other cylinders.

Combustion misfires can be detected by measuring the cylinder pressure. Furthermore, what are referred to as knocking sensors have been proposed. A further possibility is to measure the ion current in the cylinder. Such detection methods are complex. Alternatively, the speed of the crankshaft is determined by means of a rotational speed sensor on the crankshaft. Said rotational speed changes significantly as a result of a combustion misfire.

If, however, driven elements, such as secondary assemblies, clutch components and/or transmission components such as two-mass flywheels, are mounted on the crankshaft and apply to the crankshaft reactive torques in a chronologically dependent dynamic fashion, because of a brief misinterpretation of the crankshaft speeds owing to this highly dynamic application of brief changes in torque at the crankshaft, this may result in an incorrect interpretation of the currently applied engine torque with the result that the engine management system then controls the internal combustion engine incorrectly. This may lead, for example, to excessive torques at driven elements and therefore to overloading with premature failure of said elements, to loss of comfort and to increased fuel consumption.

An object of the invention is therefore to propose a drive train and an associated method for cylinder equalization of a drive unit, which, despite reactive torques of driven elements being applied in a chronologically varying and dynamic fashion, permits improved detection of combustion misfires of the drive unit. Furthermore, an object of the invention is to keep the expenditure for such correction simple and economical in terms of costs.

The object is achieved by means of a method for operating a drive train having a drive unit which is controlled by means of a control unit and having a drive shaft and an element which is operatively connected thereto and is driven thereby, wherein at least one state value of the driven element is stored in the control unit and an induced engine torque is determined with the at least one state value, and said state value is used to detect combustion misfires. Likewise, the object is solved by the corresponding drive train using the designated method.

A control unit is to be understood in this case as being a computing unit with a microprocessor and a memory, with the necessary steps for controlling the drive unit being carried out in the computing unit and corresponding sensor signals for characterizing the driver's torque request and further input variables being registered in a corresponding input unit, calculated with the aid of the engine data stored, for example, in an engine characteristic diagram, and output in an output unit to the affected units such as, for example, injection nozzles or injection pumps which are activated as a function of the output signal. Further parameters, such as the engine rotational speed or further data which are present on the CAN bus, are usually also read in order to control the internal combustion engine. This control unit is usually connected to further control units, for example for controlling the brakes, a possibly present automated clutch or a control unit for controlling an automated transmission which is possibly present, or further control units. It may also be advantageous to combine and match a plurality of control units for optimizing the installation space and/or the electrical components or computing power of the control units to form one control unit or a reduced number of the total number of control units.

According to the invention, at least one state variable of a driven element is read into the control unit for controlling the drive unit and, if appropriate, stored. The state variable is then used in the algorithms for controlling the internal combustion engine so that a behavior of the internal combustion engine which is adapted to the driven element is brought about by using this at least one state variable. For example, the compensation of an event which has a disruptive effect on the drive unit and which results from the driven element can be carried out at least partially by means of the at least one state variable.

A drive unit in the sense of this invention is to be understood as an assembly which requires external control and has a drive shaft whose rotational speed can be varied as a function of a driver's request. In this sense, a drive unit can preferably be a reciprocating piston engine with a crankshaft and also a rotary piston engine with a correspondingly configured drive shaft. In a further sense, the inventive configuration applies to an electric motor with a drive shaft, which electric motor is disrupted by a driven element and therefore has to be corrected by means of the state variable.

A drive element is understood to be an element which receives a torque from the drive shaft or outputs a torque to it. According to the invention, said element may be a two-mass flywheel which, on the one hand, is connected by a mass to the drive shaft so as to rotate with it and can therefore take up a torque in an inelastic fashion, and, on the other hand, has an elastically coupled secondary mass which, in particular in the dynamic operating state, can transmit a torque to the drive shaft and can therefore lead to disruption of the control of the drive unit. Furthermore, such components can be formed by other elements in the drive train, for example torque converters, transmission components such as for example, shafts or gearwheels or hybrid electric machines.

Driven elements can also be further components in the drive train which are connected to the vehicle body or driven wheels which, under certain circumstances, give rise to reactive torques in the crankshaft and, therefore, cause the control of the internal combustion engine to be disrupted. For example, different degrees of adhesion of the wheels to a roadway can give rise to reactive torques. State variables which can be applied to such processes can be determined and also processed in order to compensate disruption in the control unit.

Furthermore, driven elements can be formed by secondary assemblies such as fuel pumps, current generators, air conditioning compressors and the like or belt drives, camshafts, adjustment devices and valve drives and the like.

In addition to the detection of combustion misfires, the following typical control functions of the control unit can be improved, for example, by the drive train according to the invention and the associated method:
 engine control by means of engine torques,
 signal, validation and adaptation of a real-time engine torque model,
 cylinder equalization,
 idling control,
 anti-jolt control,
 load shock control,
 optimization of injection angle and ignition angle,
 optimization of the injection quantity,
 detection and adaptation of pre-injection quantities,
 regulation and adaptation of engine starting,
 regulation and adaptation of the start-up process,
 determination of frictional torques of a clutch between the internal combustion engine and transmission,
 functional checking of the engine control unit,
 general engine diagnosis,
 improved control of assemblies in the drive train, for example, clutch, converter, transmissions of all types, slip control of the clutch, slip control of the drive wheels,
 control processes in hybrid applications,
 transmission protection,
 determination of the combustion chamber pressure of individual cylinders or determination of a dynamic average pressure of the cylinders,
 analysis of components of drive assemblies such as, for example, a two-mass flywheel (determination of the position of components of a two-mass flywheel).

It may be particularly advantageous if, when a plurality of state variables are present, they are combined in what is referred to as a state space. A state space is to be understood as meaning a number of state variables which are each dependent on time and characterize a transmission system. These state variables can be used to determine or calculate the output variables necessary to control the transmission system, said determination or calculation being carried out as a function of an input variable which is also time-dependent and with the assumption that there are known initial values.

Described in physical terms, in this case the state variables describe the energy content of a system so that, in addition to the equations for the dependence of the output variables on the state variables, the input variables and the initial values for the number of state variables, a correspondingly large number of differential equations can be formed which represent the dynamic behavior of the state variables.

Considered in terms of vectors, the equations from these two equation systems can be considered as matrix systems in the case of linearity and invariance of the system over time, it being possible to represent and calculate individual coefficients in the elements of said systems by matrices. For a more detailed explanation of the handling of state space models in measuring and control technology, reference should be made to "Otto Föllinger, Regelungstechnik—Einführung in die Methoden und ihre Anwendung, 8th edition".

By using the dependent data, produced in this way in the state space from state variables, input variables and output variables, it is possible to develop a state space model which is identified and validated by means of model data and/or empirically acquired data of the driven element. If the state space model and these data correspond, the drive unit engine torque which is disrupted by the influence of the driven element can be at least partially compensated in real time.

The input variables used are advantageously data which can easily be measured. While the measurement of torques for torque correction of the drive unit is comparatively complicated, it has been found that using rotational speeds can be particularly advantageous. As a result, output variables can be acquired by inverting the state space model composed of rotational speeds in the dimension of a torque. In addition, model data of the drive unit are advantageously registered during the identification of the driven element so that the corrected torque moment can be acquired directly as output variables. In this way, the corrected engine torque of a large number of applications—as explained above with reference to typical application examples—can be used both during operation of a vehicle with a drive unit and also for diagnosing the engine behavior and/or drive train behavior.

It has proven particularly advantageous to use the proposed method for a drive train with a drive unit such as an internal combustion engine with a crankshaft and a two-mass flywheel mounted thereon and has a primary part which is accommodated on the crankshaft, and a secondary part, wherein the two parts are mounted one on the other and limited with respect to one another counter to the force of a spring device, and can rotate in relation to one another with respect to the rotational speed predefined by the crankshaft. The secondary part generally has a friction clutch by means of which the secondary part, and therefore the drive unit, can be coupled to the transmission which is arranged downstream in the direction of action. Of course, changed embodiments in which an electric machine is intermediately connected in parallel or in series as well as all forms of secondary outputs are also covered by the invention. The two-mass flywheel serves to isolate oscillations generated by the combustion process of an internal combustion engine. In specific operating states, in particular when the load acting on the compressed spring device is relieved, the two-mass flywheel is able to apply reactive torques to the internal combustion engine and able to disrupt the control behavior of the unit for controlling the internal combustion engine, through a brief, undetected change in the rotational speed which can lead to said effects.

The two-mass flywheel can, as a spring device, have bow springs and/or short helical springs for forming one or more damper stages, and the springs here can also be combined by means of further force accumulators such as rubber elements and arranged on different diameters.

A hysteresis device, which in conjunction with the spring device contributes to damping, can be superimposed on the spring device. The hysteresis device can be formed by two or more friction partners which are in wet or dry friction contact with each other and which can be formed from advantageously prestressed friction faces which are located axially or radially with respect to one another. Friction contact which is dependent on centrifugal force can advantageously be produced during a relative rotation of the two parts, each having a predefinable mass with a moment of mass inertia formed with them during rotation, by virtue of the fact that springs which extend over a circumference, for example bow springs, are entrained by a part, for example the secondary part, and are pressed at their outer radius under centrifugal force against a radial support of the other part, for example the primary part, and therefore form, during a relative rotation of the two parts, a centrifugal-force-dependent hysteresis force, under the effect of which the two parts are more difficult to rotate with respect to one another. Further advantageous exemplary embodiments of friction devices can be, for example, friction partners which are axially stressed with respect to one another, of which is arranged on the primary side and the other on the secondary side in a rotationally fixed fashion or with rotational play. In terms of oscillation technology, the two-mass flywheel acts as a low pass filter between the crankshaft and the transmission input shaft with typical attenuation of the oscillation amplitude associated with a phase shift of the oscillation frequency.

As already mentioned above, when the state space is converted into a vector equation system, a linear equation system must be existent. As a rule, differential equations of system models, for example a two-mass flywheel, are not linear. However, if the controlled system has an approximately linear behavior in a certain working range, the differential equations can often be linearized for this working range, for which a sufficiently small size is selected. From there, linear state differential equations and output value equations can then be produced. The behavior of two-mass flywheels may be non-linear, in particular owing to the bow spring characteristic with a rotational-speed-dependent hysteresis, prestressed springs and free angles of the hysteresis devices. According to the invention, the two-mass flywheel is therefore linearized by representing the behavior of the two-mass flywheel functionally by means of physical relationships and then differentiating it at the working points to be used. A further method of linearization may be particularly advantageous, by means of which an approximately linear model is used as the basis and a validity range is set in which an occurring fault does not exceed a predefined limit. Such a model can be selected on a case-by-case basis. For example, in an extreme case models may be configured as "black box models" which provide a very good approximation of the input and output behavior and do not require physical prior knowledge of the kinematic processes. At the other extreme, the modeling of a state space can be carried out in such a way that equations are used, which precisely describe the kinematics of the system (white box model). The subsequent identification then supplies the desired compensation independently of the selected model by virtue of the fact that the variables of the state space are selected in such a way that optimized correspondence is achieved between the empirically supported or model-supported data of a two-mass flywheel and the input and output variables of the state space model.

In one particularly advantageous exemplary embodiment, a simplified model for a two-mass flywheel can be used which includes a linear spring/damper element which is effective between two masses, specifically a primary mass connected to the drive shaft, and a secondary mass connected to the output. The state variables of this linear model correspond here to the nonlinear state variables of a in a sufficient manner. Of course, the model may be selected as a function of the type of two-mass flywheel and as a function of the design of the two-mass flywheel, in a wider sense, the corresponding models (black box models, grey box models, white box models) can also be advantageously optimized for each driven element.

By way of example, the following relationships are obtained for the simplified model:

$$J_{pri} \cdot \dot{\omega}_{pri} = M_{pri} - c \cdot (\alpha_{pri} - \alpha_{sek}) - d \cdot (\omega_{pri} - \omega_{sek}) \qquad (1)$$

and $$J_{sek} \cdot \dot{\omega}_{sek} = -M_{sek} + c \cdot (\alpha_{pri} - \alpha_{sek}) + d \cdot (\omega_{pri} - \omega_{sek}) \qquad (2).$$

Here, $J_{pri}$ and $J_{sek}$ denote the moments of mass inertia of the primary or secondary flywheel mass, $M_{pri}$ and $M_{sek}$ denote the primary or secondary mass of the two-mass flywheel, c denotes the stiffness of the spring elements which are effective between the two masses, and d denotes the torsional damping of the damping elements which are effective between the two masses, $\alpha_{pri}$ and $\alpha_{sek}$ denote the absolute angles of the primary and secondary mass with respect to the crankshaft and its variables of the angular speeds $\omega_{pri}$ and $\omega_{sek}$ and the angular accelerations $\dot{\omega}_{pri}$ and $\dot{\omega}_{sek}$, derived over time.

If the relative angle between the primary and secondary sides and the rotational speeds of the two flywheel masses are defined as state variables, the following state vector is obtained:

$$\underline{x} = \begin{pmatrix} \alpha_{pri} - \alpha_{sek} \\ \omega_{pri} \\ \omega_{sek} \end{pmatrix} \qquad (3)$$

Equation (1) and equation (3) yield the following state space representation:

$$\dot{\underline{x}} = \begin{pmatrix} 0 & 1 & -1 \\ -\dfrac{c}{J_{pri}} & -\dfrac{d}{J_{pri}} & \dfrac{d}{J_{pri}} \\ \dfrac{c}{J_{sek}} & \dfrac{d}{J_{sek}} & \dfrac{d}{J_{sek}} \end{pmatrix} + \begin{pmatrix} 0 & 0 \\ \dfrac{1}{J_{pri}} & 0 \\ 0 & \dfrac{1}{-J_{sek}} \end{pmatrix} \cdot \underline{u} \qquad (4)$$

The inventive idea relating to this exemplary embodiment provides merely an evaluation by means of the signals of the speeds $\omega_{pri}$ and $\omega_{sek}$, so that the output vector $\underline{y}$ is given the following form:

$$\underline{y} = \begin{pmatrix} 0 & 1 & 0 \\ 0 & 0 & 1 \end{pmatrix} \cdot \underline{x} = \begin{pmatrix} \omega_{pri} \\ \omega_{sek} \end{pmatrix}. \qquad (5)$$

Of course, the output vector can assume a different form with other measurement variables such as, for example, the capture of accelerations, angles and torques.

If a state space such as the one shown above by way of example is produced, the identification of the driven element which is to be compensated, for example a two-mass flywheel, is carried out. For this purpose, the invention determines a selection of physical input variables which are sufficient for the determination of the estimated output variables. It has been found that a selection of irrelevant and redundant data leads to unnecessarily complex calculations, and the absence of relevant input variables can lead to a lack of clarity of the output variables.

It may be advantageous, for example, if data which are obtained from a model calculation and/or from empirical trials are subjected to an outlier test, for example, a median filter. Furthermore, it may be advantageous to filter the input variables, for example by means of a Butterworth low-pass filter. In such frequency-selective filters, a cutoff frequency is predefined, up to which signals are transmitted virtually without modification. Signal components with higher frequencies are heavily damped. Of course, further advantageous filters can additionally or alternatively be used, with adaptation to noise which occurs in the input variables.

In order to identify a driven element further, such as the two-mass flywheel in this case, it is necessary to define the order of the linear state space model. The elementary two-mass flywheel has proven to advantageously be of the order n=3, with the ordinal number resulting from the number of state variables which can be used to describe an ideal spring/damper element. The definition of the order must usually be carried out separately for each driven element and the underlying model.

After the order of the system has been determined, the usually chronologically continuous system has to be converted into an equivalent time-discrete system. This means, taking the example of the two-mass flywheel, that owing to the input data, a state space representation is present which has to be subsequently transferred into a time-discrete state space model. For this purpose, a numeric evaluation of the general solutions of the state differential equation can advantageously be carried out, or a numerical integration of the state differential equation by means of numeric integration methods can be carried out. In order to determine the discretized model and its variables it is subsequently possible to apply what is referred to as a least square estimator in which the intervals between the output variables from a number of n measurements are set, preferably minimized. Carrying out this routine subsequently produces the parameters c, d, $J_{pri}$, $J_{sek}$ which are defined in equation (4), that is to say the two-mass flywheel with its real behavior is mapped onto the model and identified. Subsequent validation of the underlying model can be carried out, for example, by using the acquired parameters to calculate the model with predefined rotational irregularities, and comparing it with a real behavior of a two-mass flywheel with the same rotational irregularities. At this point, it is still possible to make corrections to the model when there are large deviations.

A model of a driven element which is produced in this way can then be stored in the control unit, and corresponding output variables can be input into the engine controller. Using the example of the two-mass flywheel, the primary and secondary rotational speeds of the respective flywheel masses are estimated by predefining engine torques and load torques. Torques in a motor vehicle can usually be measured only with a comparatively high degree of expenditure so that according to the inventive idea it is advantageous to invert the state space model. When the inversion is carried out, the input variables of the inverted system then represent the rotational speeds of the primary and secondary flywheel masses, while the output variables represent torque values of the engine or load torque values. In this way it is possible to use a simple sensor system, for example, by means of rotational speed signal transmitters, on the primary and secondary flywheel masses to determine the induced engine torque. It is therefore possible for the engine torque which is output as a setpoint variable to be compensated with this induced engine torque in such a way that the influence of the two-mass flywheel on the engine can be at least partially eliminated. Of course, such an inverted model should be checked for invertibility beforehand and then be validated again. In this context, the load which acts from the drive train on the secondary side of the two-mass flywheel can be determined in an analogous fashion, as a result of which an estimation of the load moment at the two-mass flywheel can be obtained.

One advantageous exemplary embodiment of the invention is, in addition to the compensation of the engine torque disrupted by the behavior of a two-mass flywheel, a steady-state reconstruction of the engine torque for the purpose of cylinder equalization. This may require extending what is referred to as a confidence interval of the model, in which trustworthy data are determined and calculated, by applying the two-mass flywheel by means of what are referred to as local linear models (LoLiMoT). Here, the confidence interval describes the working range around the local identification working point in which the model still supplies sufficiently good results. By using local linear neuro-fuzzy models, complex modeling problems are split up into numerous relatively small and as a result simpler subsystems, which in turn can be described by linear submodels. With respect to the application and execution of the abovementioned filter systems and the LoLiMoT model, reference should be made to U. Kiencke/H. Jäkel "Signale und Systeme" [signals and systems]", 3rd edition Verlag Oldenbourg.

After the engine torque (induced engine torque) has been reconstructed, it can be used according to the invention for the detection of combustion misfires. As a result, a torque value which is independent of the influences of the driven element or a torque value which is compensated in terms of its influences is made available.

For example, combustion misfires can be derived from the general formulae for calculation of the induced engine torque $M_{Motor}$ by using an additional rotational speed sensor placed at the output side of the driven element, so that the influence of the driven element on the engine torque can be determined or estimated. For example, given a driven element in the form of a two-mass flywheel, the rotational speed of the primary and secondary sides are determined and input into the state space model as input variables, and the induced engine torque $M_{Motor}$ is estimated in accordance with the description above. Combustion misfires can be determined from the induced engine torque $M_{Motor}$ on the basis of the exemplary embodiment described below.

The induced engine torque $M_{Motor, rek}$ is composed of the gas torque $M_{Gas}$, the mass moment $M_{Mass}$, the valve moment $M_{Ventil}$ and the frictional moment $M_{Reib}$. If the engine torque is then divided into its individual moments, the following is obtained:

$$M_{Motor}=M_{Gas}-M_{Mass}-M_{Ventil}-M_{Reib} \qquad (6)$$

The combustion misfires are detected according to the invention by means of the work provided by the individual cylinders. For this purpose, equation (6) is integrated via a cylinder-associated segment. In a four-cylinder engine, the integration is carried out from the top dead center (OT) to the bottom dead center (UT), that is to say over a crankshaft angle of 180°, with the bottom dead center of the i-th cylinder corresponding to the top dead center of the i+1-th cylinder, which yields:

$$\int_{OT(i)}^{OT(i+1)} M_{Motor}\, d\alpha = \int_{OT(i)}^{OT(i+1)} \left( \begin{array}{c} M_{Gas} - M_{Mass} - \\ M_{Ventil} - M_{Reib} \end{array} \right) d\alpha \qquad (7)$$

This produces the following for the work of the cylinder i:

$$W_{Motor,i} = W_{Gas,i} - W_{Mass,i} - W_{Ventil,i} - W_{Reib,i} \qquad (8)$$

The valve moment $M_{Ventil}$ over a crankshaft angle of 180° is without a mean value. Likewise, at a steady-state working point the mass moment $M_{Mass}$ is without a mean value, with the result that the two work values $W_{Ventil,i}$ and $W_{Mass,i}$ of the cylinders i become 0.

The gas moment $M_{Gas}$ is composed of the compression moment $M_K$ and the expansion moment $M_E$ as well as the combustion moment $M_{Verb}$. In a way which is analogous to the valve moment and mass moment, the compression moment and expansion moment are virtually free of mean values so that the resulting work can also be ignored.

If a combustion misfire of the cylinder i occurs, the combustion energy $W_{Verb,i}$ becomes smaller than an anticipated value or equal to zero. For the sake of better clarity, a negligible combustion energy $W_{Verb,i}$ is assumed in the exemplary embodiment, and the following is obtained for the work of the cylinder i from equation (8):

$$W_{Motor,i} = -W_{Reib,i} \qquad (9)$$

A combustion misfire can now be detected if the work $W_{Motor,i}$ of the cylinder i drops below a predefined limit $\epsilon$:

$$\int_{OT(i)}^{OT(i+1)} M_{Motor}\, d\alpha = W_{Motor,i} < \varepsilon \qquad (10)$$

The limit $\epsilon$ can be predefined with such a small value that possibly occurring cylinder-specific irregularities and associated dips in work of a cylinder are not detected as combustion misfires On the other hand, the limit $\epsilon$ is advantageously selected with such a large value that even incomplete combustion is reliably detected.

In order to advantageously evaluate combustion misfires it is possible to provide that, after the limit $\epsilon$ has been undershot, what is referred to as a flag or a counter, which is evaluated by a software routine implemented in the control unit, is activated. For example, after a single combustion misfire or after a predefined number of combustion misfires it is already possible to output a warning signal, activate a fault memory and/or compensate the combustion which has not occurred or has occurred incorrectly. Such compensation can be carried out by means of cylinder compensation methods such that, given corresponding processing of the limit $\epsilon$ or of said flags or counters, a cylinder compensation method can be started or be operated in an extended fashion by means of this information.

According to one advantageous exemplary embodiment, the limit $\epsilon$ may have multiple stages. By evaluating the stages which are formed in this way it is possible to make a qualitative statement about the combustion. For example, by classifying the combustion work $W_{Verb,i}$ of the individual cylinders i into the stages of "satisfactory combustion", "incomplete combustion" and "faulty combustion" it is possible to derive different measures. Evaluating the frequency in the different classes of the individual cylinders makes it possible to assess whether a warning is output, a repair shop has to be visited and/or whether appropriate measures for improving a detected state can be carried out by the engine management system by changing, for example, the air supply and/or fuel supply.

The invention will be explained in more detail with reference to FIGS. 1 and 2. In this respect FIG. 1 shows an inventive sequence of a control process; and FIG. 2 shows a way of producing a state space model explained using the example of a two-mass flywheel.

FIG. 1 shows an exemplary sequence for the control process 1 according to the invention. In block 2, a setpoint value for the control process 1 is made available, which value can be calculated as an initial value by an engine controller and output.

The setpoint value may be, in the case of an internal combustion engine, the desired torque which is predefined by a driver by means of the accelerator pedal. Correspondingly, this desired torque can be set as a function of further parameters such as engine characteristics, the gear speed engaged in the transmission, operating situation of the vehicle, condition of the roadway and the like. In block 3, the setpoint value 2 is applied to a controlled system which can comprise the internal combustion engine and downstream components such as, for example, a clutch, a two-mass flywheel or drive train components such as secondary assemblies and downstream transmissions. Using the example of a two-mass flywheel, the setpoint torque which is output to the internal combustion engine is disrupted, in particular in addition to other interfering influences from further components of the drive train by the two-mass flywheel, through its torque-dependent rotation of the two flywheel masses, so that, for compensating the disruption, according to the invention, in block 5 a state space model for compensating the disruptions is integrated.

Figure 2:
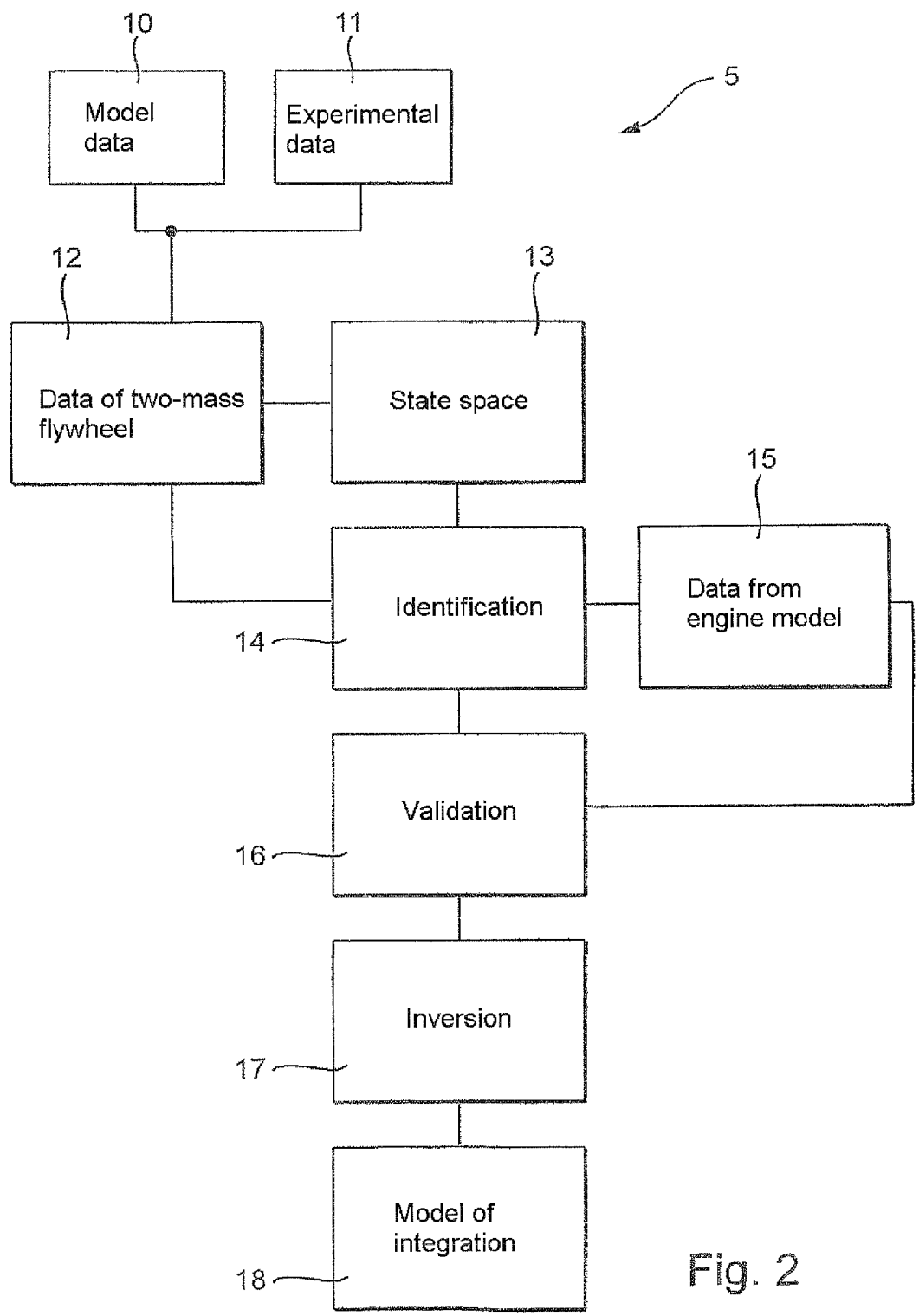

The creation of a state space model is explained in more detail with respect to FIG. 2. In order to operate the state space model, input variables are determined from the controlled system 3 and processed in the state space model. Input variables can, according to the invention, be all variables which, for example, are made available as registered data to the control unit. For example, it is therefore in fact possible for the control unit to have available, on what is referred to as a CAN bus, data such as rotational speeds, accelerations, current values and voltage values and the like. In order to compensate the behavior of the two-mass flywheel it may, in particular, be advantageous to use signals which detect the rotational speed of the primary mass and secondary mass, in which case variables derived therefrom such as rotational speed accelerations and angular speeds may be advantageous for the evaluation.

After the state space model 5 has been run through, it outputs output variables in block 6, which variables can be readout and used to correct the setpoint value 2 over a suitable signal path 7. Of course, such a control routine can be calculated in a serial or parallel fashion with respect to other control routines in a control unit, for example by means of a microprocessor.

The creation of a state space model 5 as in FIG. 1 will be explained in more detail in FIG. 2 using an example of a typical driven element in the form of a two-mass flywheel.

On the one hand, model data which are acquired from calculation programs, can be used in block 10 as a basis for the mathematical and physical description of a two-mass flywheel, based on corresponding simulation data of the real two-mass flywheel. On the other hand, alternatively or additionally, it is possible, in block 11, to make available experimental data to a data record represented in block 12 for the corresponding two-mass flywheel, and said data can be acquired from bench trials with a real two-mass flywheel.

A state space model, which models the two-mass flywheel under the conditions which are predefined for a state space, is developed in block 13 from the assessment of the data in block 12. For example, linear equation systems have to be present for the mathematical treatment of the state space.

With the aid of data which are present in block 12, and data of a motor model, for example characteristic diagrams of an internal combustion engine, which are additionally present in block 15, the two-mass flywheel which is located in the state space 13 is identified, that is to say coefficients which are located in the state space are adapted in such a way that the greatest possible approximation between real measurement data of the two-mass flywheel result as a function of fluctuating torques of the internal combustion engine and a real behavior of the two-mass flywheel under the same internal combustion engine conditions.

When the two-mass flywheel is identified, it is validated in the subsequent block 16. The validation determines the system accuracy of the state space and determines the marginal conditions of the applicability of the model. Engine data from block 15 can also be used for the validation in block 16.

In order to acquire output variables which correspond to the setpoint value in terms of their dimension and are at the same time based on simple input variables, it may be particularly advantageous to carry out what is referred to as inversion in block 17. Initially, state space models are created in energy units, with input variables being input in the dimension of torques and a corresponding behavior of the two-mass flywheel resulting in differential rotational speeds of the two flywheel masses. In order to avoid complex determination of measurable torques in a real environment such as in a motor vehicle, it is advantageous, in particular when determining interference variables of a two-mass flywheel, for the state space which is modeled in block 13 to be inverted in block 17. This means that, as input variables, the corresponding rotational speeds or their derived variables of the two-mass flywheel are now used as input variables for the state space model, and induced engine torques or interference torques are therefore available as output variables. Of course, the mathematical function (preferably stability) of a model which is inverted in this way should also be checked and validated.

The model which is available in block 18, after the preceding procedures have been carried out, is inserted as state space model 5 in corresponding control loops according to FIG. 1.

LIST OF REFERENCE NUMERALS

1 Control routine
2 Setpoint value formation block
3 Controlled system block
4 Input variable reading in block
5 Block for state space model
6 Output variable reading out block
7 Signal line
10 Block for model data
11 Block for experimental data
12 Block for data record of two-mass flywheel
13 Block for state space
14 Identification block
15 Block for data of engine model
16 Validation block
17 Inversion block
18 Model integration block

The invention claimed is:

1. A drive train for a motor vehicle, comprising:
 a drive unit which is controlled by a control unit having a plurality of cylinders;
 a drive shaft; and
 an element which is operatively connected thereto and is driven thereby,
 wherein at least one state value of a driven element is read into a control unit and combustion misfires are detected with the at least one state value, and
 wherein the driven element is registered analytically by means of the at least one state value as a state space model.

2. The drive train as claimed in claim 1, wherein analytic data registration is carried out on a basis of experimentally determined data of the driven element.

3. The drive train as claimed in claim 1, wherein the state space model is inverted.

4. The drive train as claimed in claim 1, wherein an induced engine torque of the drive unit, which is to be adjusted and which is subjected to an interference torque through properties of the driven element, is at least partially reconstructed by means of a compensation variable which is determined from the at least one state value.

5. The drive train as claimed in claim 4, wherein the induced engine torque is determined on an up-to-date basis.

6. The drive train as claimed in claim 1, wherein a model of the drive unit is integrated into the state space model of the driven element.

7. The drive train as claimed in claim 6, wherein analytic data registration is carried out on a basis of data of a modeled, driven element.

8. The drive train as claimed in claim 1, wherein for each cylinder combustion energy is determined from induced torque.

9. The drive train as claimed in claim 8, wherein, when work of one cylinder drops below a predefined value, a flag, a counter and/or a fault memory are activated.

10. The drive train as claimed in claim 1, wherein a plurality of the at least one state value are combined in a state space.

11. The drive train as claimed in claim 10, wherein input variables, which characterize movement of the driven element, are input into the state space, and, in order to determine induced engine torque characteristic variables, are formed and output.

12. The drive train as claimed in claim 11, wherein at least one of the input variables is a rotational speed.

13. The drive train as claimed in claim 1, wherein the driven element is a two-mass flywheel which is mounted on the drive unit, with a primary side which is connected to the drive shaft and a secondary side which is connected by means of a clutch to a transmission which is arranged downstream of the flywheel.

14. The drive train as claimed in claim 13, wherein at least rotational speeds of the primary and secondary sides are used as input variables.

15. The drive train as claimed in claim 13, wherein a nonlinearized behavior of the two-mass flywheel is linearized.

16. The drive train as claimed in claim 15, wherein linearization is carried out by differentiating nonlinear movement equations at a predefined working point.

* * * * *